US006407828B1

(12) United States Patent
Medina

(10) Patent No.: US 6,407,828 B1
(45) Date of Patent: *Jun. 18, 2002

(54) DOCUMENT TRANSMISSION MODULE CONNECTABLE TO DATA SOURCE FOR TRANSMITTING DATA IN STANDARD OR HIGH SPEED MODES

(75) Inventor: Mitchell Medina, Essex Fells, NJ (US)

(73) Assignee: International Patent Holdings LTD, Hamilton HM EX (BM)

( * ) Notice: Subject to any disclaimer, the term of this patent is extended or adjusted under 35 U.S.C. 154(b) by 0 days.

This patent is subject to a terminal disclaimer.

(21) Appl. No.: 09/087,938

(22) Filed: Jun. 1, 1998

Related U.S. Application Data

(63) Continuation-in-part of application No. 08/364,181, filed on Dec. 27, 1994, now Pat. No. 5,801,842.

(51) Int. Cl.$^7$ ................................................ H04N 1/40
(52) U.S. Cl. ........................ 358/462; 358/468; 358/435; 379/100.01
(58) Field of Search ................................ 358/468, 435, 358/436, 438, 462, 439, 434; 379/100.01

(56) References Cited

U.S. PATENT DOCUMENTS

| | | | | |
|---|---|---|---|---|
| 4,922,348 A | * | 5/1990 | Gillon et al. | 358/407 |
| 5,274,474 A | * | 12/1993 | Medina | 358/462 |
| 5,377,021 A | * | 12/1994 | Mori | 358/462 |
| 5,436,981 A | * | 7/1995 | Ishikawa | 358/462 |

* cited by examiner

Primary Examiner—Thomas D. Lee
(74) Attorney, Agent, or Firm—Foley & Lardner

(57) ABSTRACT

A document transmission module is connected between a conventional document digitizing device (host unit) and a communication interface. The module receives conventional data output from its host unit and re-transmits them to a destination document transmission protocol machine in one of standard and high speed modes depending on the compatibility of the destination document transmission protocol machine. The standard mode communication employs an image data format for both text and graphics. The high speed mode distinguishes text from graphics and performs optical character recognition on suspected character information. When characters are successfully recognized, only a code, e.g. ASCII, and the location of the character is transmitted, realizing significant improvements in compression ratios over conventional data transmission. Graphics and unrecognizable characters are transmitted as bit-mapped pixels or in conventional compressed fax format. The document transmission module is also capable of receiving incoming data from transmitting machines through the communication interface in both the standard and high speed modes. Data sent and received in the high speed mode contain codes for text characters and bit-mapped or compressed pixels for graphics and unrecognized characters and are either printed or recorded in a storage medium. Since text characters are received as codes, any desired printing resolution can be selected for them.

80 Claims, 12 Drawing Sheets

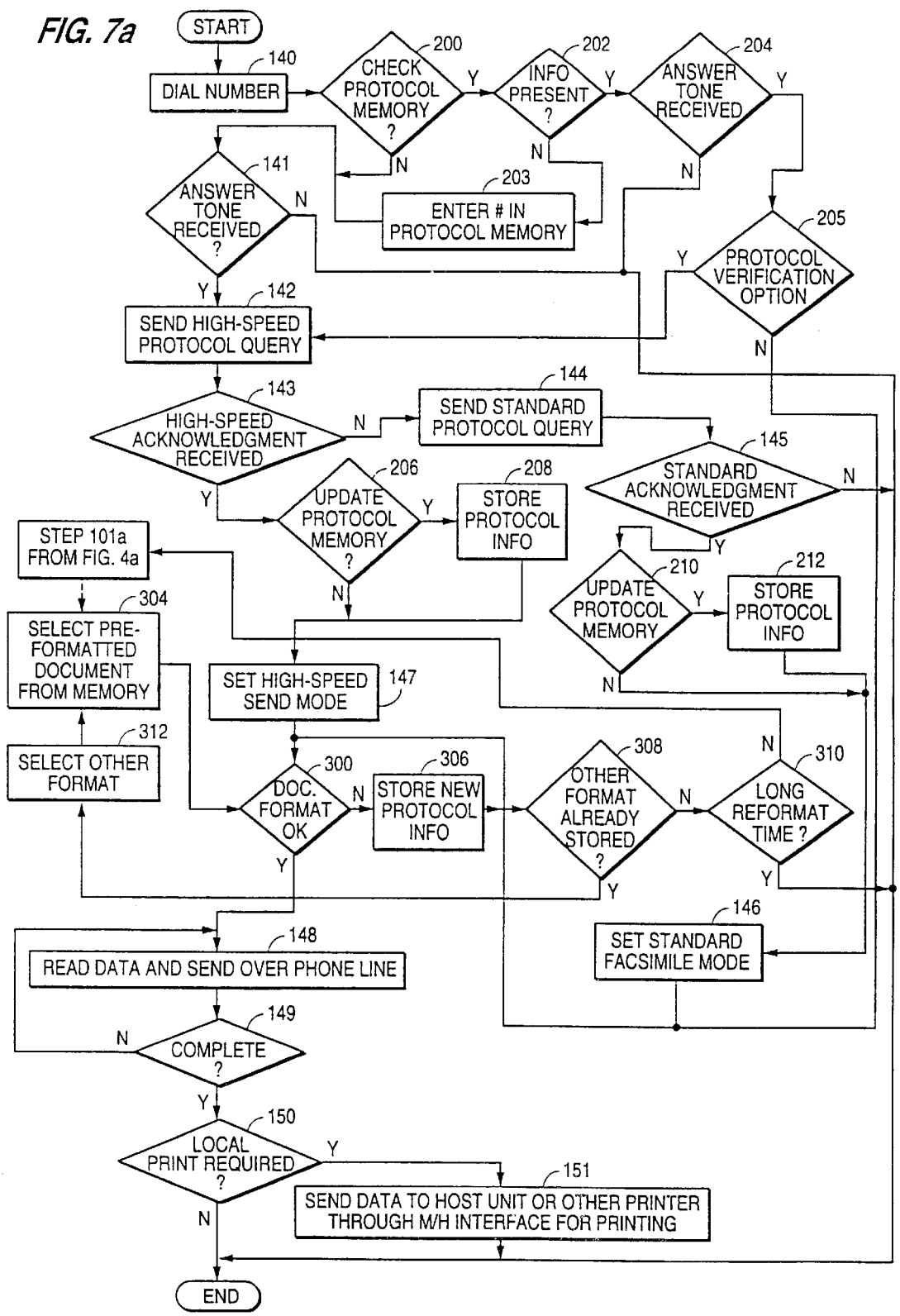

DOCUMENT TRANSMISSION MODULE CONNECTABLE TO DATA SOURCE FOR TRANSMITTING DATA IN STANDARD OR HIGH SPEED MODES

CROSS REFERENCE TO RELATED APPLICATION

The instant application is a continuation-in-part of application Ser. No. 08/364,181, filed Dec. 27, 1994 now U.S. Pat. No. 5,801,842 issued on Sep. 9, 1999.

BACKGROUND OF THE INVENTION

1. Field of the Invention

This invention relates generally to a document transmission module connectable to conventional source of digitized image data such as a computer, scanner, phone line, telefacsimile machines and the like. In one embodiment, the invention may be implemented using a document transmission module connected between a conventional telefacsimile source (also referred to as a host telefacsimile unit) and a communication interface. The document transmission module has the ability to distinguish recognizable characters from unknown graphics, and to transmit codes for the recognizable characters with less data than that required by bit maps or employed in conventional telefacsimile devices.

2. Related Art

Conventional telefacsimile or fax machines scan a document to produce pixel data. This pixel data is then compressed and sent over communications media such as telephone lines to a receiving fax machine. A problem with such telefacsimile machines is the absence of maximal data compression for characters due to the lack of efficient coding for character data.

U.S. Pat. No. 4,410,916 issued to Pratt discloses a dual mode telefacsimile compression technique, wherein spatially isolated black and white pixel patterns expected to recur in a document are extracted and coded by a matching process. A trial block area around a block pixel is examined to isolate symbols. Isolated symbols are labeled and a set of measured features is used to build a library. Each symbol subsequently found in trial blocks of the scan is compared to the features of the blocks to eliminate unworthy symbols from a template matching process. If the matching error falls below a threshold, the identification of the matching library number is stored for later coding. If no symbol is found within a trial block, the block is encoded as residue using a modified relative address code and processed separately. The symbols's library identification codes and residue codes and the codes of unsuccessfully compared symbols are transmitted to receivers. The specialized coding in Pratt is quite slow due to the need to perform extensive template matching for each character. Pratt does not distinguish text from graphics, and fails to provide flexible operation in other modes, such as transmission of bit maps, so that communication is only possible among similarly equipped units.

U.S. Pat. No. 4,566,127 to Sekiya discloses a telefacsimile having an optical character reader and a central processing unit which provide coding character information and a telefacsimile mode. However, Sekiya is limited to operation with documents of a predetermined format in which character groups having predetermined attributes are disposed in a first location of the document and images having predetermined attributes are disposed in a predetermined second location.

U.S. Pat. No. 4,922,545 to Endo discloses a telefacsimile image coding method in which an input image pattern which occurs once is sequentially scanned and conventionally encoded. Patterns appearing twice or more, according to a matching pattern, are encoded by position coordinates and a library identification code is added at the time the pattern is registered in a library. This system is primarily a handwriting recognition system, and there is no provision for flexible operation with units not similarly equipped.

SUMMARY OF THE INVENTION

An objective of this invention is to provide a document transmission module, connectable to any one of millions of conventional sources of data such as computer outputs, scanners, phone lines, telefacsimile machines or the like which provides quicker transmission of documents and a higher quality printout than conventional mechanisms.

In one embodiment of the invention there is provided a document transmission protocol module, connectable to conventional telefacsimile machines or sources, which permits transmission of documents in either a high speed mode or a standard mode.

A still further object of the invention is to provide a document transmission module, connectable, for example, to conventional telefacsimile devices which, while providing the above advantages when communicating with other suitably equipped telefacsimile devices, is still capable of communicating with conventional telefacsimile machines.

A document transmission module, according to this invention, has the capability of recognizing characters on a document. Characters are converted by an optical character recognition (OCR) means to produce character codes for recognizable ASCII or the like. Any unrecognizable characters and areas of the document which are graphics or other non-character information are coded according to a recognized image data transmission protocol. The coding of both character and non-character information includes means for enabling data from both coding modes to be reproduced in its original spatial relationship at a destination device (computer, facsimile machine, printer, display monitor etc). The document is transmitted as a combination of character codes, such as ASCII codes, and other recognized data transmission protocols i.e., telefacsimile codes or other generally available image data transmission formats. This results in higher compression ratios for documents containing a number of recognizable characters and therefore allows reducing the transmission time of a document.

The document transmission module according to the invention may operate in either a standard mode or in the described high speed mode. The document transmission module receives input from a conventional data source to which it is connected and is capable of expanding conventionally compressed data (i.e., fax data) to a format compatible with its OCR engine, if such engine cannot process the compressed data. The module would typically query or otherwise determine whether a receiving machine (or a conventional device equipped with a similar document transmission module) can process the high speed mode containing character code data and non-code data or whether the receiving machine can only process standard non-code data (i.e., telefacsimile data). The transmitting module may automatically switch modes between the described high speed mode or the standard mode according to whether the receiving machine can process the high speed mode. Therefore, a document transmission module according to this invention is capable of communicating with existing data sources such as telefacsimile devices, computer outputs, scanner outputs and the like.

In the high speed mode, since character codes, in ASCII or other defined character sets, are sent and then received by the receiving device, characters may be printed as fully formed characters rather than as low resolution pixel data. Therefore, documents sent using this document transmission module can be more legible in the character areas than documents sent by conventional non-coded (pixel by pixel) devices (i.e., facsimile machines).

BRIEF DESCRIPTION OF THE DRAWINGS

FIG. 7a illustrates the integration of optional features in FIG. 4a with an alternative method of document transmission.

DETAILED DESCRIPTION OF THE PREFERRED EMBODIMENTS

U.S. Pat. No. 5,274,474 issued to Medina discloses an integrated telefacsimile device and method for telefaxing documents in standard and high speed modes and is herein incorporated by reference.

While the document transmission module in accordance with the invention may be used to transmit data between any of a plurality of data sources, such as scanners, telefacsimile devices, phone lines (carrying data), computers and the like, an embodiment of the invention will be particularly described in connection with the document transmission module taking the form of a telefacsimile module for connection to a conventional telefacsimile machine. However it is to be understood that, for example, an automated image digitizing unit (e.g., a scanner) may typically be used to feed directly into the described telefacsimile module with the telefacsimile module parsing the incoming data into text and graphics files. In general, any suitable format may be used to transmit the data, as, for example, transmitting the data as e-mail and/or attachments via the internet, or publishing the data in disclosed location or a location known to be accessible to the recipient using HMTL or other protocols. Image data may be linked to text data with appropriate tags embedded in one or both files to permit proper reconstruction of the original image and text into the proper spatial relationships. For example, headers or embedded information may specify the proper position, size and orientation of graphic data relative to text data or the page (or display) edge or corner. The savings in transmission time and the improved quality of the image/text received are advantages attributable to the invention regardless of what particular data transmission medium or format is used.

With the above in mine, the embodiment of the invention using the document transmission module in the form of a telefacsimile module will now be described in reference to the figures.

Figure 1:
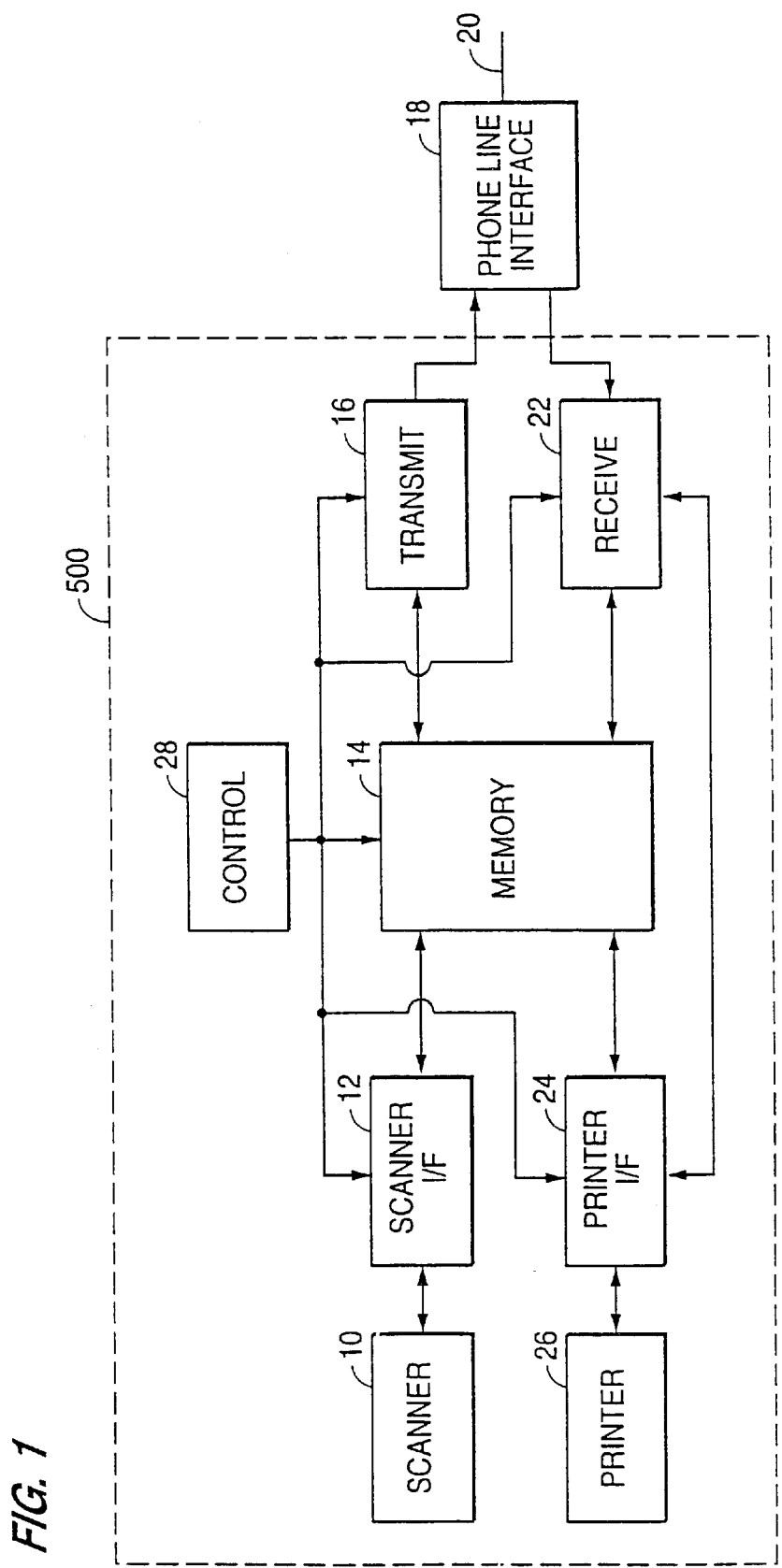
FIG. 1 is a block diagram of a telefacsimile coding transmission and reception system.

FIG. 1 is a block diagram of a telefacsimile coding transmission and reception system. A scanner 10 converts a document into bit-mapped pixels and sends them through the scanner interface 12 to the memory 14 or directly to the transmit section 16. The scanner interface 12 (otherwise referred to as a scanner control and data interface) controls the scanner 10 and processes the pixel data which is sent from the scanner 10 to the memory 14 or sent directly to the transmit section 16. After the pixel data has been processed by the scanner interface 12, the transmit section 16 sends this data through a communication (e.g., a phone line) interface 18 and over a phone line 20 to a receiving fax machine.

In the reception mode data comes in over the phone line 20 through a communication interface 18 and is placed in memory 14 by the receiving block 22, or else is sent directly to the printer interface 24. Printer interface 24 reads this received data from memory 14, or directly from the receiving block 22, processes this data, and sends it to a printer 26 to be printed as a received document. A controller 28 containing, for example., a programmed microprocessor, sequences the operation of the telefacsimile machine.

Figure 2:
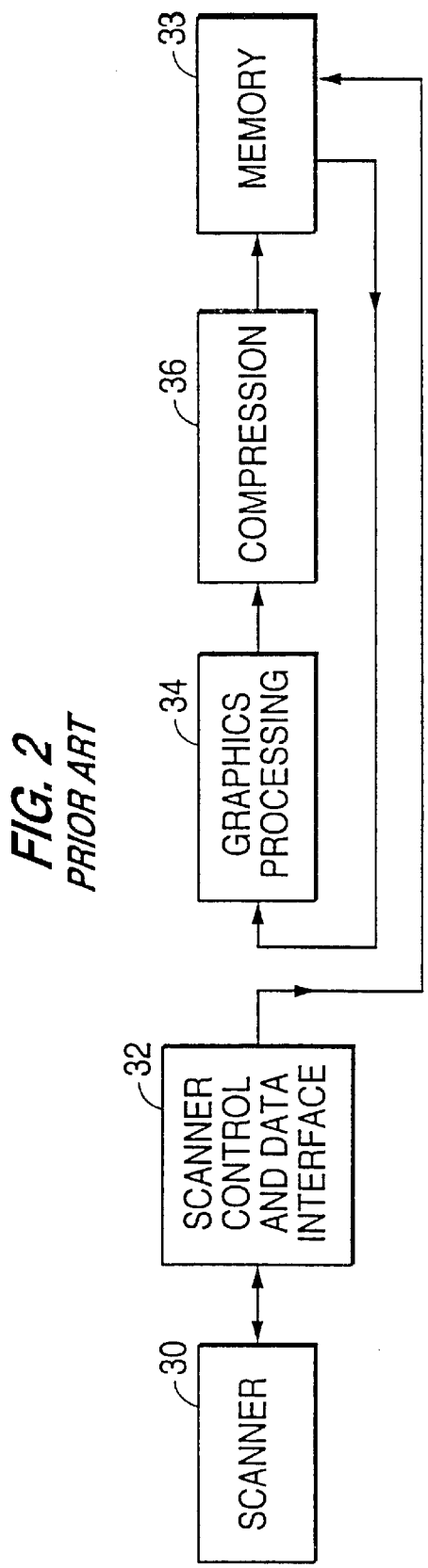
FIG. 2 is a typical conventional scanner interface.

A conventional telefacsimile scanner and telefacsimile scanner interface is shown in FIG. 2. Scanner 30 converts the document into bit-mapped pixels which are fed through scanner control and data interface 32 to memory 33. This pixel data, coded in standard telefacsimile format by graphics processor 34, is compressed using standard telefacsimile methods by compression block 36 and placed in memory 33 in preparation for transmission.

Figure 2A:
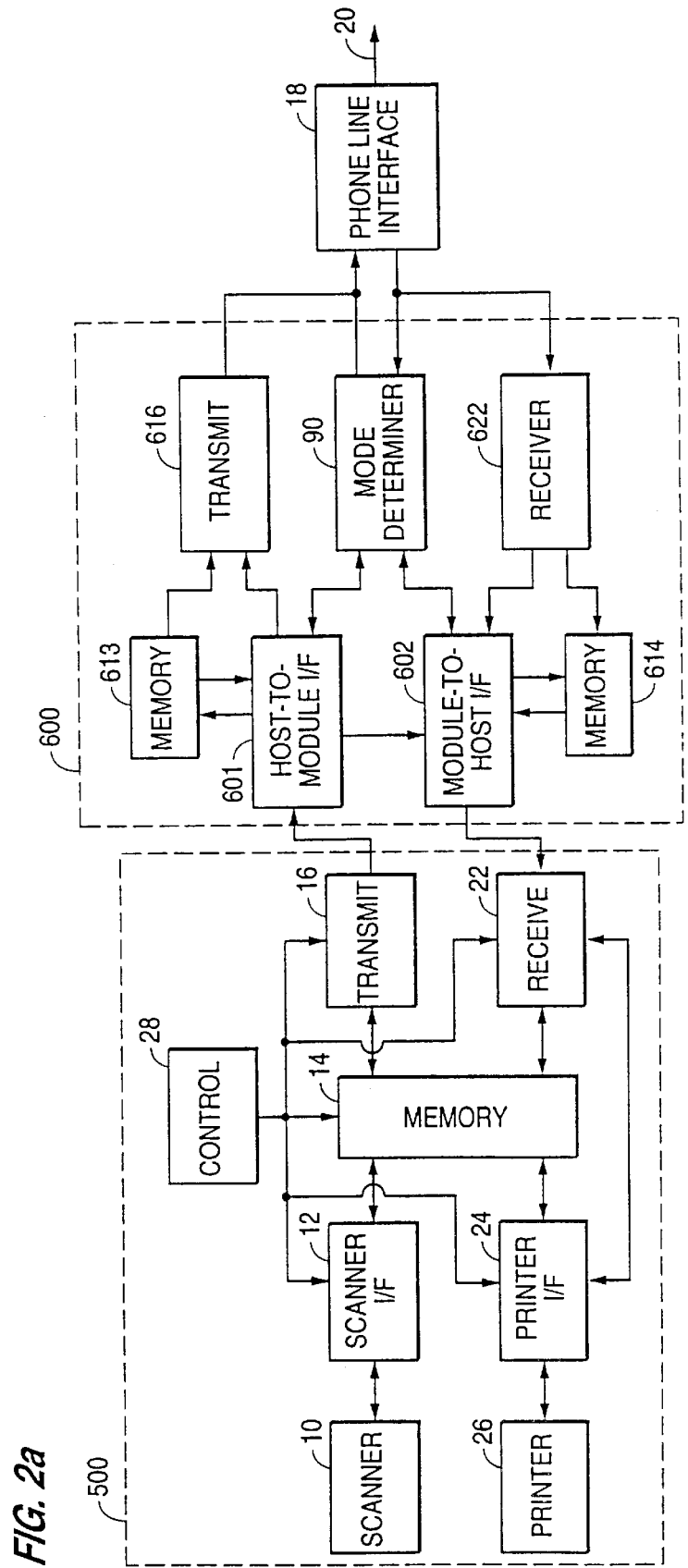
FIG. 2a is a block diagram of the telefacsimile module connected between a host unit and a phone line interface.

FIG. 2a is a block diagram of the telefacsimile module 600 connected between a host unit 500, such as a conventional telefax machine, and a communication interface 18. The host unit 500 is the same as that shown in phantom in FIG. 1, though any conventional facsimile source could be used. The telefacsimile module 600 receives data from its host unit 500 through the host unit's transmitting section 16. A host-to-module (H/M) interface 601 controls the reception and processes the conventional fax data to a memory 613 or sends it directly to a transmit section 616. After the conventional fax data has been processed by the H/M interface 601, the transmit section 616 sends this data through the communication interface 18 and over the phone line 20 to a receiving fax device.

In the reception mode, fax data comes in over the phone line 20 through a communication interface 18 and is placed in memory 614 by the receiving block 622, or else is sent directly to the module-to-host (M/H) interface 602. The M/H interface 602 reads this received data from memory 614, or directly from the receiving block 622, processes this data, and sends it to the receiving block 22 of the host unit 500 for printing.

The mode determiner 90 queries the receiving fax device to determine if the receiving device can process data sent in the high speed mode. Alternatively, the mode determiner 90 may optionally consult a protocol memory 80 (shown in FIG. 3) of stored destination fax numbers and their capabilities, and/or request or receive user instructions 81 (shown in FIG. 3) prior to or in place of querying the destination machine. If the receiving machine is not equipped with a telefacsimile module according to this invention and is not a similarly equipped device, such as the device in U.S. Pat. No. 5,274,474, capable of handling data transmitted in the high speed mode, data is sent in the standard mode. In the standard mode, the telefacsimile module 600 merely retransmits the data it receives from the host unit 500. Likewise, if data is received in the standard mode, the telefacsimile module 600 merely retransmits the data it receives to the host unit 500.

Figure 3:
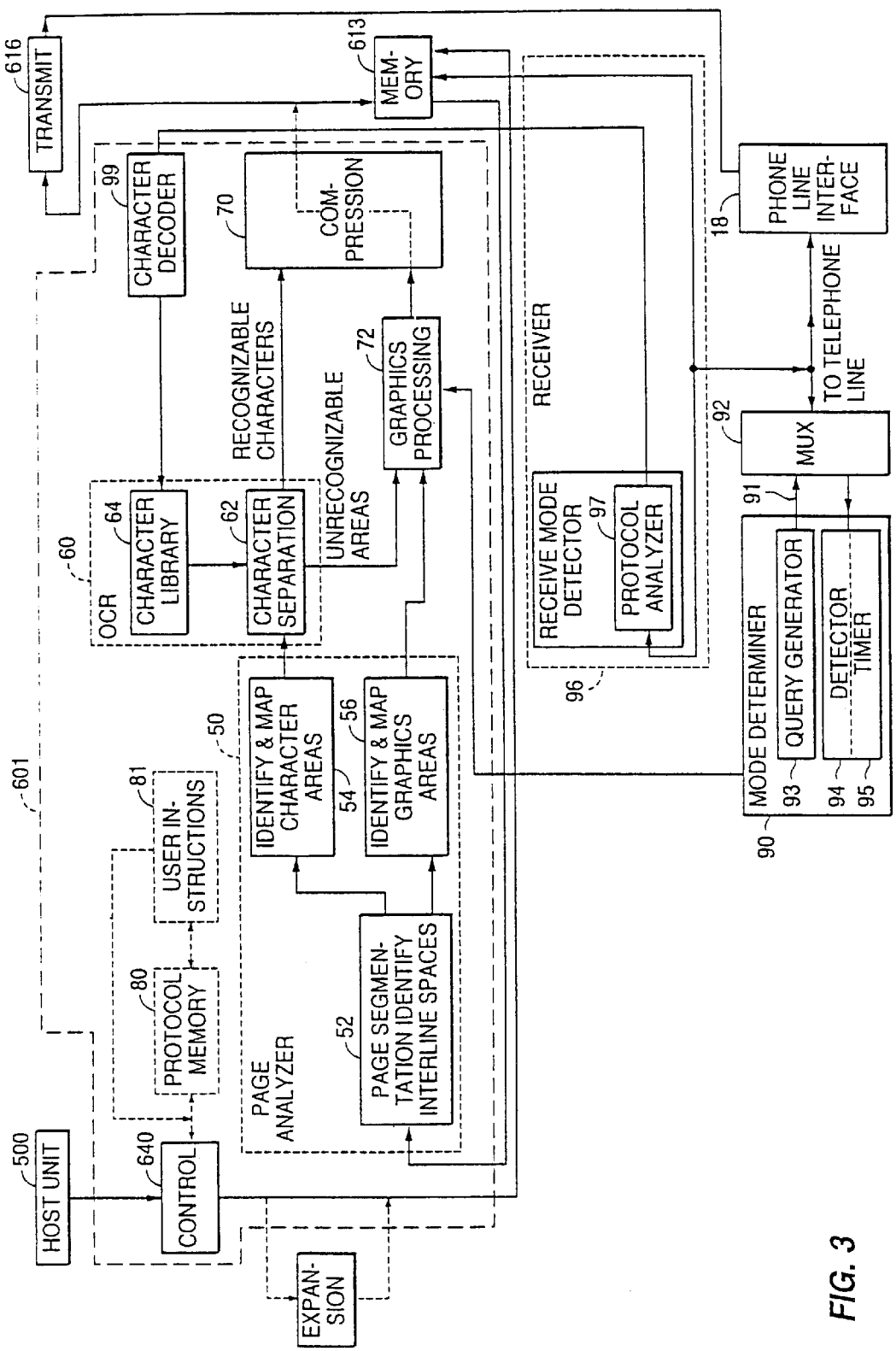
FIG. 3 is a host-to-module interface according to the invention.

FIG. 3 is a block diagram of the H/M interface 601 according to the present invention. The telefacsimile module operates in either a standard or a high speed mode, depending on the capability of the receiving fax machine. A mode determiner 90 has a mode query signal generator 93 which transmits a mode query signal along line 91 to the receiving or destination fax machine, for example through multiplexer 92, and analyzes the response. If detector 94 determines that the destination fax has responded with a predetermined signal, the high speed mode is set by the facsimile module. If the facsimile module detects a signal other than the predetermined signal or if no response is detected within a predetermined time measured by timer 95, the facsimile module sets the standard mode.

A host telefacsimile device 500 converts a document into conventional fax information and transmits this information to control 640. Depending on the characteristics and capabilities of the OCR engine 60, the conventional fax data may be expanded before being placed in memory 613. The H/M interface 601 may analyze the document separating it into character areas and graphics areas, code this information, compress this information and place it back into memory 613. Alternatively, the information could be provided directly to transmit section 16 without intermediate storage in memory 613.

One portion of the H/M interface 601 is dedicated solely to control as indicated in block 640. One function of the control 640 is to command the H/M interface 601 to retransmit data through the transmit section 616 upon receiving a standard mode response from the receiving fax device, the protocol memory 80 or user instructions 81. In addition, optionally, a page analyzer 50 may analyze a page of a document or, alternatively, a section of a page, such as ⅛ to ¼ of a page at a time and separates the document or portion of the document into character areas and graphics areas. Portions identified as character areas are sent to the optical character recognition block 60. Recognizable characters are sent as character codes in ASCII or the like to a compression block 70 and then sent to memory 613, or sent directly to transmit section 616. Unrecognizable pixel patterns and, optionally, entire areas identified as graphics areas by the page analyzer 50, are sent to a graphics processing block 72 to be processed into a standard telefacsimile data format through the compressor 70, and then sent to memory 613, or directly to transmit section 616 without intermediate storage in memory 613.

Inside the page analyzer 50 a page segmentation processor 52 analyzes the pixels of a compressed or expanded conventional fax page to identify interline spaces. Other methods of distinguishing character and non-character information may be used, as for example, segmentation of pages into sectors for analysis, comparison with predefined document templates stored in memory, within the facsimile module itself or in a computer peripheral to the fax assembly, etc. Horizontal areas of low pixel density might indicate spaces between lines of text if these horizontal lines are repetitive and evenly spaced. Horizontal spaces which are not evenly spaced may indicate borders between graphics areas. Areas of low pixel density which run vertically may indicate spaces between columns of text or graphics areas. Areas of a document which are tentatively identified as containing character information by the page segmentation processor 52 are sent to block 54 so that these character areas can be further identified and mapped in preparation for optical character recognition by block 60. Areas of a document which are tentatively identified by the page segmentation processor 52 as being composed of unrecognizable character, non-character or graphics information are sent to block 56 to further map and identify these areas of the document. The information is then sent to the graphics processing block 72 to be processed as standard telefacsimile data.

Potential character data which is sent to the OCR block 60 is first analyzed by character separation block 62. Character separation block 62 separates a line into individual characters. These characters are then compared against those contained in a character library 64 which contains a set of standard ASCII characters or another or a variety of defined character sets. This is accomplished using well-known character recognition techniques which can identify a large variety of fonts accurately, or using omnifont OCR if sufficient reliability can be obtained. Characters which are positively identified are coded as characters and sent to the compression block 70. Unrecognizable characters or graphics areas are sent by the character separation block 62 to graphics processing block 72 to be coded as standard telefacsimile data. The standard telefacsimile data from 72 is also sent to block 70 for compression (compression may be skipped if the data from the host unit has not been previously expanded) and to be concatenated and/or merged with the compressed recognizable characters and placed into memory 613, or alternately, this data may be sent directly to transmit section 616.

The H/M module interface 601 operates efficiently by using standard character recognition and page segmentation techniques. Repetitive matching techniques such as those described in U.S. Pat. Nos. 4,410,916 or 4,922,545 may also be used. The invention is, however, not limited to any fixed algorithm or method for character recognition as it is envisioned that improved character recognition algorithms will be developed in the future which would be equally applicable in performing the invention. Even present day techniques offer high gains in coding efficiency over standard telefacsimile techniques thus allowing a telefacsimile page to be transmitted in less time and, therefore, at less cost for telephone line usage then in a standard telefacsimile. Accurate recognition is important for correctly encoding and transmitting a document. Therefore, any characters which cannot be positively identified with a high degree of certainty by character separation block 62 are sent to block 72 to be processed as standard telefacsimile data.

Figure 4:
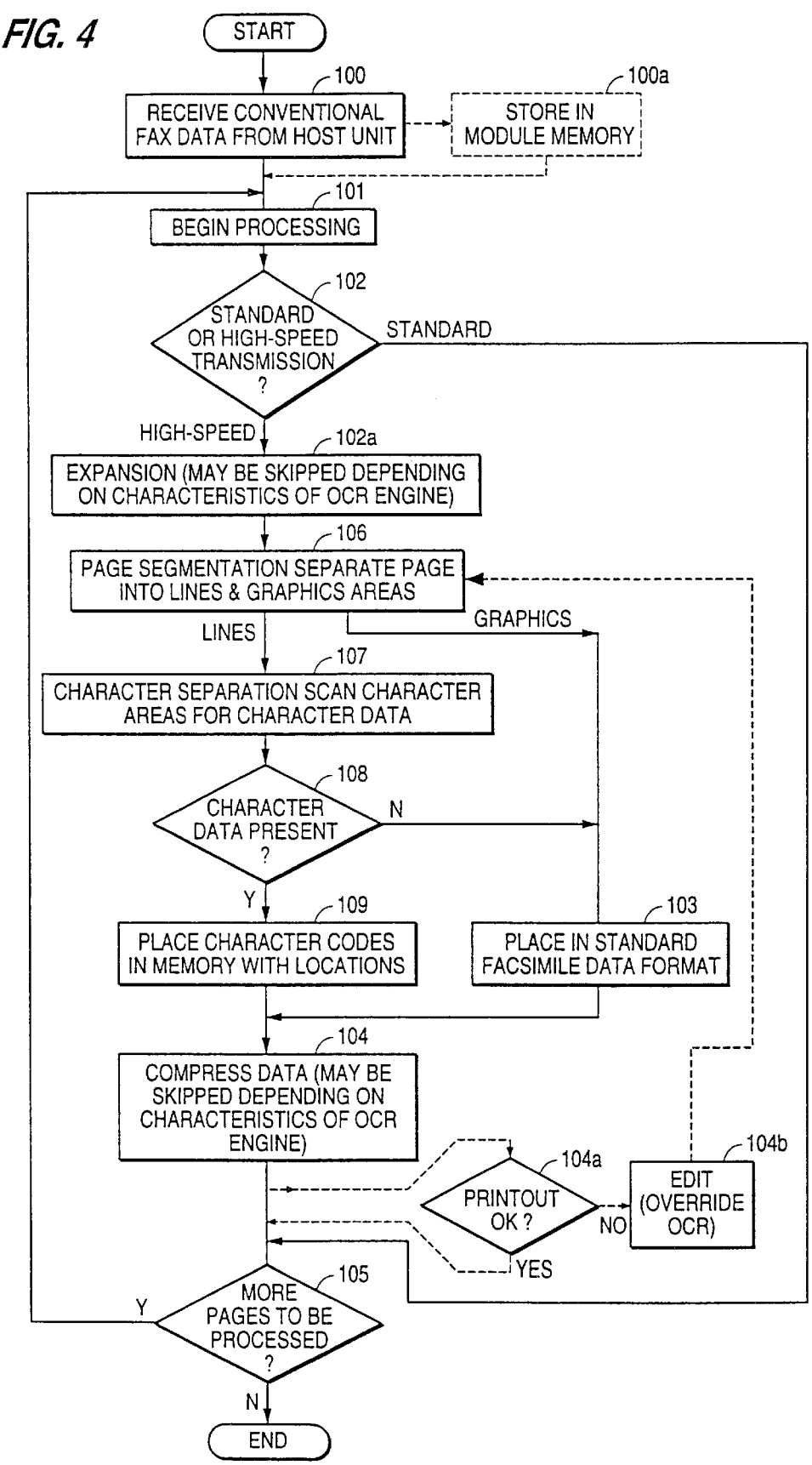
FIG. 4 is a flow chart of the operation of the host-to-module interface.

FIG. 4 is a flow chart of the operation of the H/M interface 601. In step 100 conventional facsimile data is received from the host unit 500, and in step 100*a* may optionally be stored in memory 613 (FIG. 3) prior to further processing. In step 101, a page or other suitable unit of conventional facsimile data is spooled in either from the host unit or memory 613. In step 102 the H/M interface 601 decides whether the document is to be transmitted in standard or high speed mode. The determination is based on the capability of the receiving fax machine. As previously discussed this can be determined by transmitting a signal and looking for a predetermined response from the receiver. This can either be done in a brief querying telephone call which is disconnected prior to document processing, or else the line may be held open while processing begins immediately. Alternatively, as previously discussed, a memory or directory of stored protocol information relating to individual fax numbers may be consulted, either automatically, or manually by the user, who would then input such information. If the document is to be transmitted in the standard mode, control skips to step 105. In step 105, the H/M interface 601 decides whether there are more pages to be received from the host facsimile unit. If so, control is passed back to step 101.

If step 102 decides that a document is to be transmitted in the high speed mode, control is passed to step 102a, where the conventional fax data from the host facsimile unit 500 may be optionally expanded if required for the subsequent steps of page segmentation and/or character recognition. In the optional page segmentation of step 106, a page is separated into potential character areas or graphics areas. Areas that are to be encoded as graphics are sent to step 103 for processing in standard telefacsimile data format. Areas which are to be processed as characters are sent to step 107 for character separation, whether page segmentation has been performed or not. In step 107 individual characters are isolated. A potential character is then processed in step 108 which recognizes whether an actual ASCII or other codable character is present. If the isolated character cannot be recognized, it is sent to step 103 where it is placed in standard telefacsimile data format. If the isolated character can be recognized, then in step 109 a character code for the identified character is placed in memory according to a method which enables reproduction of the location of that character at a destination facsimile device. Possible methods for achieving this purpose include identifying position coordinates for each character, and creating text files capable of cooperating with and/or being merged with overlay files for non-character or non-recognized character information. Other methods are possible and may be used by those skilled in the art. The character data is then optionally compressed in step 104. Step 105 decides whether there are more pages to be processed and, if so, control is passed back to step 101.

Figure 4A:
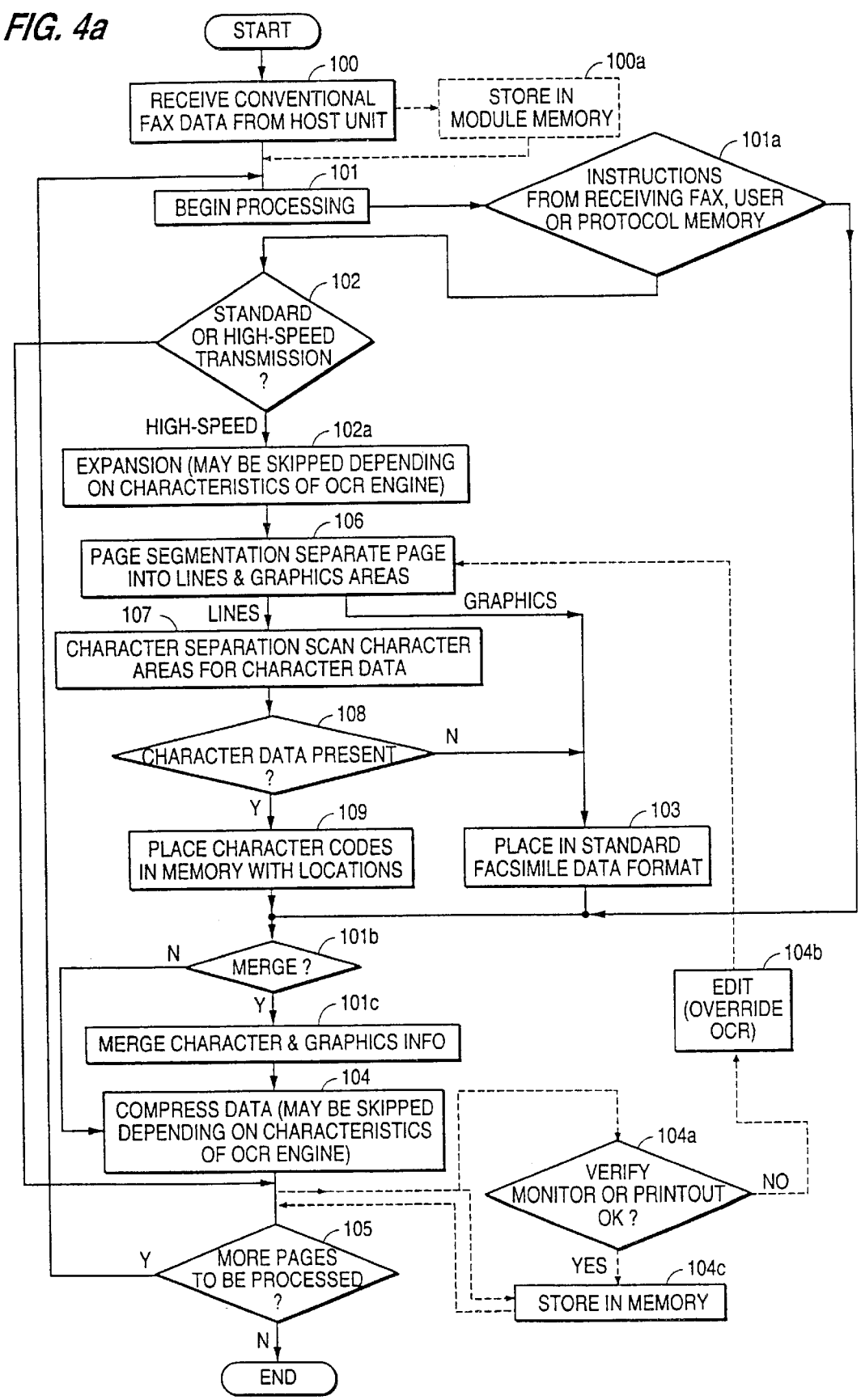
FIG. 4a illustrates optional features and an alternative embodiment of the host-to-module interface.

In FIG. 4a, a number of optional features and alternative embodiments are illustrated. In one alterative embodiment, the decision in step 102 could be delayed and a document stored in a memory in both the standard and high speed formats. Upon an indication from the receiving fax of its capability, transmission could be performed in the corresponding format.

In another slightly different embodiment, the transmitting module could maintain a preprogrammed or built up list of destination machine capabilities. For example, when a telefacsimile number is dialed for the first time the compatible format indicated by the destination machine could be stored and subsequent transmission to that destination provided in the indicated format without inquiry. Based on such stored protocol information (or on instructions from the receiving machine or the user), as shown in step 101a, character and graphics information may be merged (steps 100b and 100c) and sent to a receiver equipped to receive such information. However, such a merge is preferably implemented by a suitably equipped receiving module or device prior to or during the printing process, as illustrated in FIG. 6a. As shown in step 101b, if the merge is performed at the receiving machine, step 101c is bypassed. In addition, as shown in step 104c, information correctly formatted for printing or display can also be stored in a memory.

Figure 5:
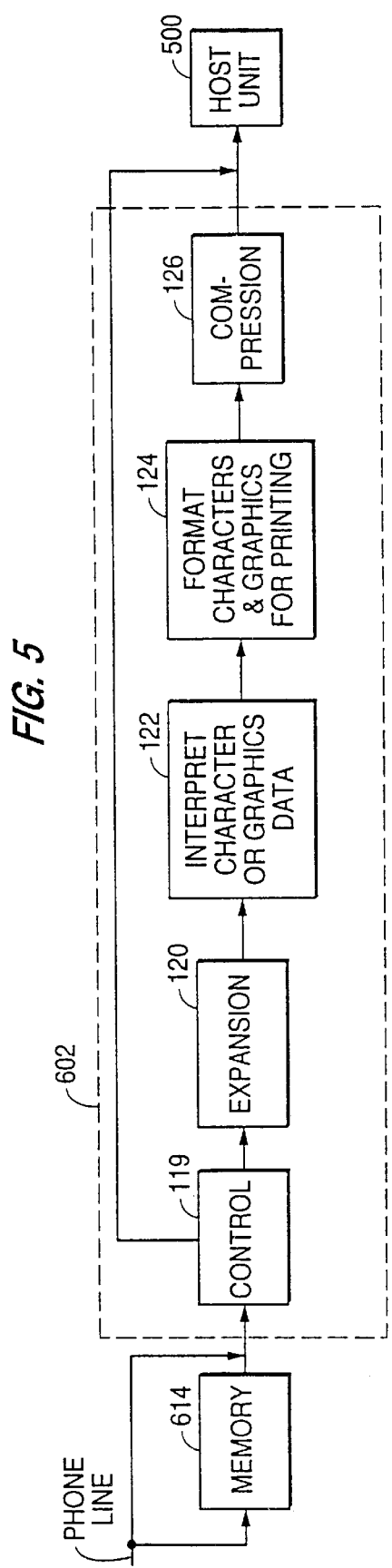
FIG. 5 is a block diagram of the module-to-host interface.

FIG. 5 is a block diagram of the M/H interface 602. When a document is sent from a transmitting facsimile over the phone line, that information is read from memory 614 or directly from the phone line, processed by the M/H interface 602 and sent to the host unit 500 for printing. In the M/H interface 602, the received data from the memory 614 or phone line is routed by control 119. If data is received in the standard mode, it is retransmitted to the host unit 500 for printing. If it is received in the high speed mode, it is decompressed or expanded in block 120, interpreted as character or graphics data in block 122, formatted as character codes or graphics codes for printing in block 124, compressed in block 126 and sent to the host unit 500 for printing. By decoding character data codes, the M/H interface 602 does not simply reproduce a received compressed or uncompressed bit map. Instead, the M/H interface 602 independently reproduces the character based on the coded information. One advantage of this is that character information may be formatted for printing at a higher resolution. This is because a character which is scanned at, for example, 300 dots per inch and identified as, for instance, an A, is transmitted as the character code for an A in ASCII or the like. The M/H interface 602 at the receiving end recognizes this character code is the letter A. Depending on the characteristics of a character-library-type OCR engine, if such is employed, it is possible to reproduce font, points, and pitch for a variety of common type styles, if desired. Since only the character code is needed, a printer can be set to print the characters at least at a different resolution, for instance 1200 dots per inch. Conventional facsimile data can be reformatted to fit this standard, or printed as scanned in conjunction with higher-resolution character data by using a two-pass printing process, or a printer with dual printheads. Therefore, a document which is sent using this telefacsimile module and which is composed mainly of text could be much more legible than a document sent using conventional telefacsimile machines. In addition, lower resolution printing could be selected to speed the printing process.

Figure 6:
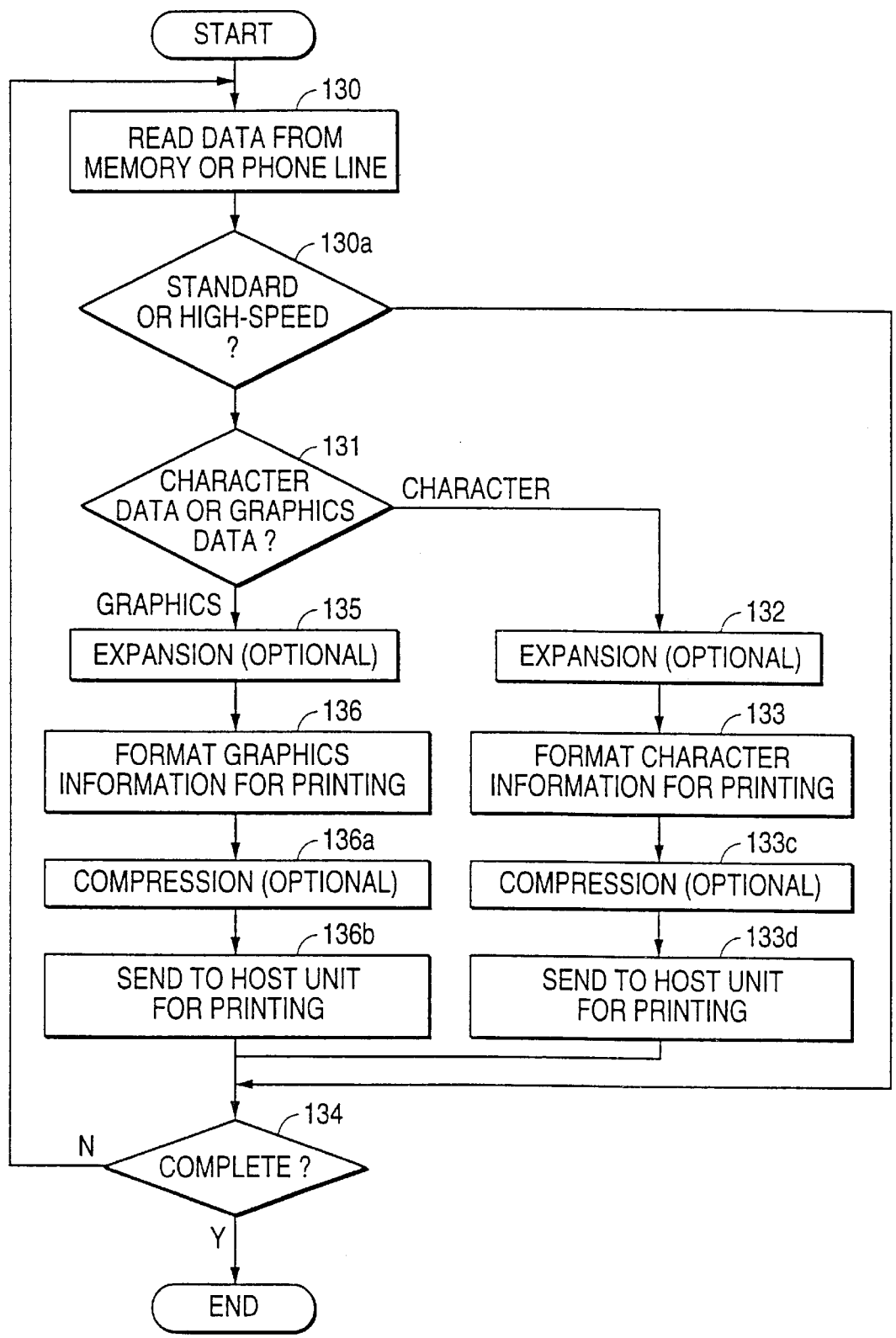
FIG. 6 is a flow chart of the operation of the module-to-host interface.
Figure 6A:
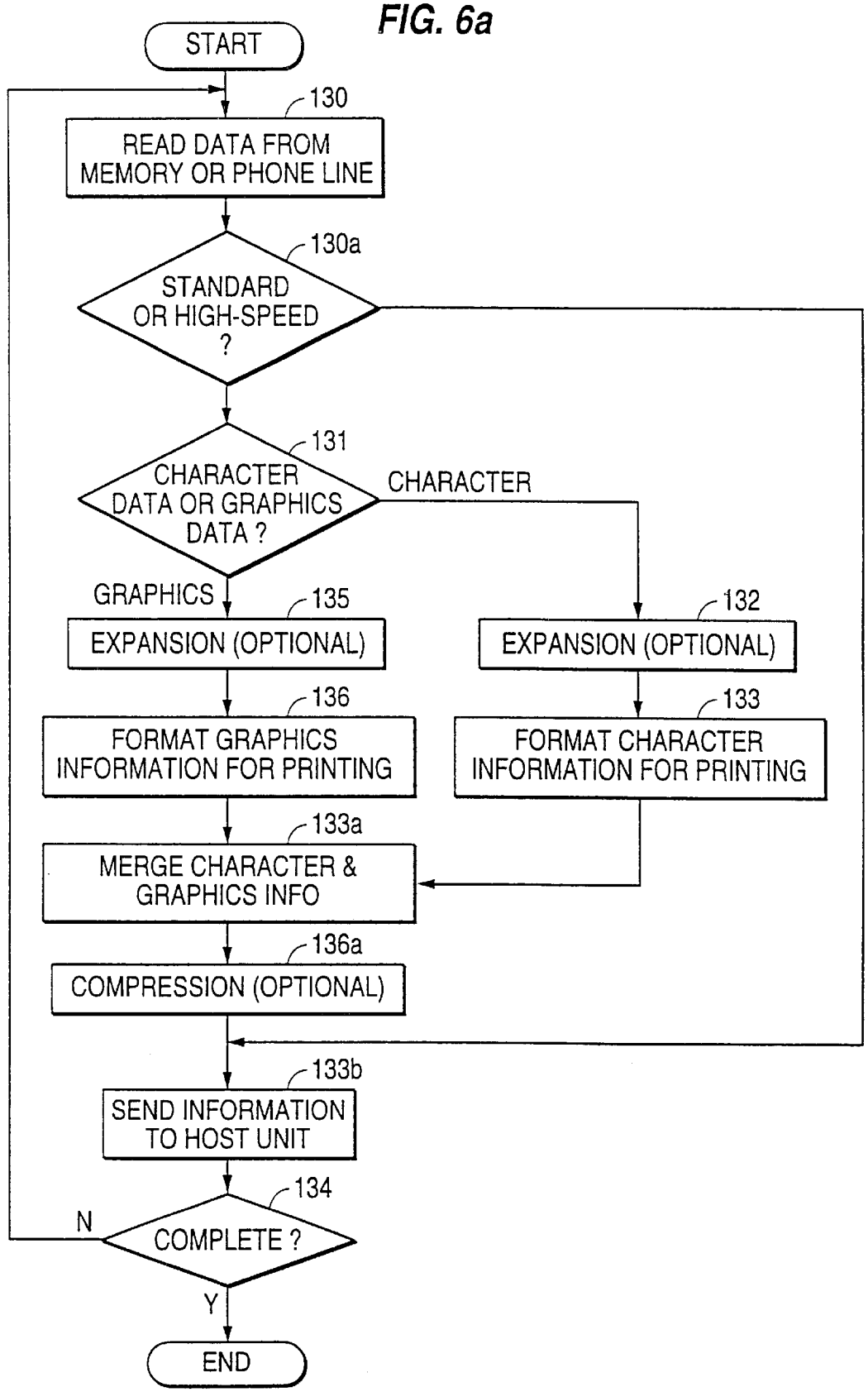
FIG. 6a is a flow chart of another mode of operation of the module-to-host interface.

A flow chart of the operation of the M/H interface 602 is shown in FIG. 6. In step 130 the data to be printed is read from memory or directly from the phone line. In step 130a, the M/H interface 602 decides whether the data is received in the standard or high speed mode. In the standard mode, control passes to step 134. In the high speed mode another determination is made at step 131 to whether the information to be printed is coded and/or compressed character data, or else compressed graphics data. If the information is character data, control passes to optional step 132, which expands the character data if necessary for preparation for step 133. The character information is put in the correct format for printing in step 133, may be compressed in step 133c and sent to the host unit 500 for printing in step 133d. If step 131 processing determines that compressed graphics data has been read from memory or the phone line, then this compressed graphics information may be decompressed or expanded in optional step 135. Then, the graphics information is formatted for printing in step 136, optionally compressed if necessary in step 136a and sent to host unit 500 for printing in step 136b. Step 134 determines whether the printing is complete. Alternatively in the high speed mode, and preferably in the standard mode, conventional facsimile data received in the module is simply transmitted to the host for printing. If printing is incomplete control passes back to step 130, where more data is read from memory or the phone line. This process continues until the page or the document is printed.

An alternate embodiment of the invention is illustrated in FIG. 6a which is similar to that of FIG. 6 but includes a step 133a wherein a process module is employed to merge character and graphics data. The merged data is sent to the host unit 500 to be printed at step 133*b*. The merged data may be stored in a memory, such as a printer memory, or routed directly to the printing apparatus in chunks of either 1 page, a fraction of a page, or even in multi-page segments depending on the characteristics of the printer itself and its spooling capabilities. A printer other than that of the host unit might be attached to the module, preferably configured to take full advantage of the potential for improved resolution inherent in the invention. Information might also be routed to a spooler or a file in the memory of a computer, and from there to printing apparatus peripherally attached to the computer.

Figure 7:
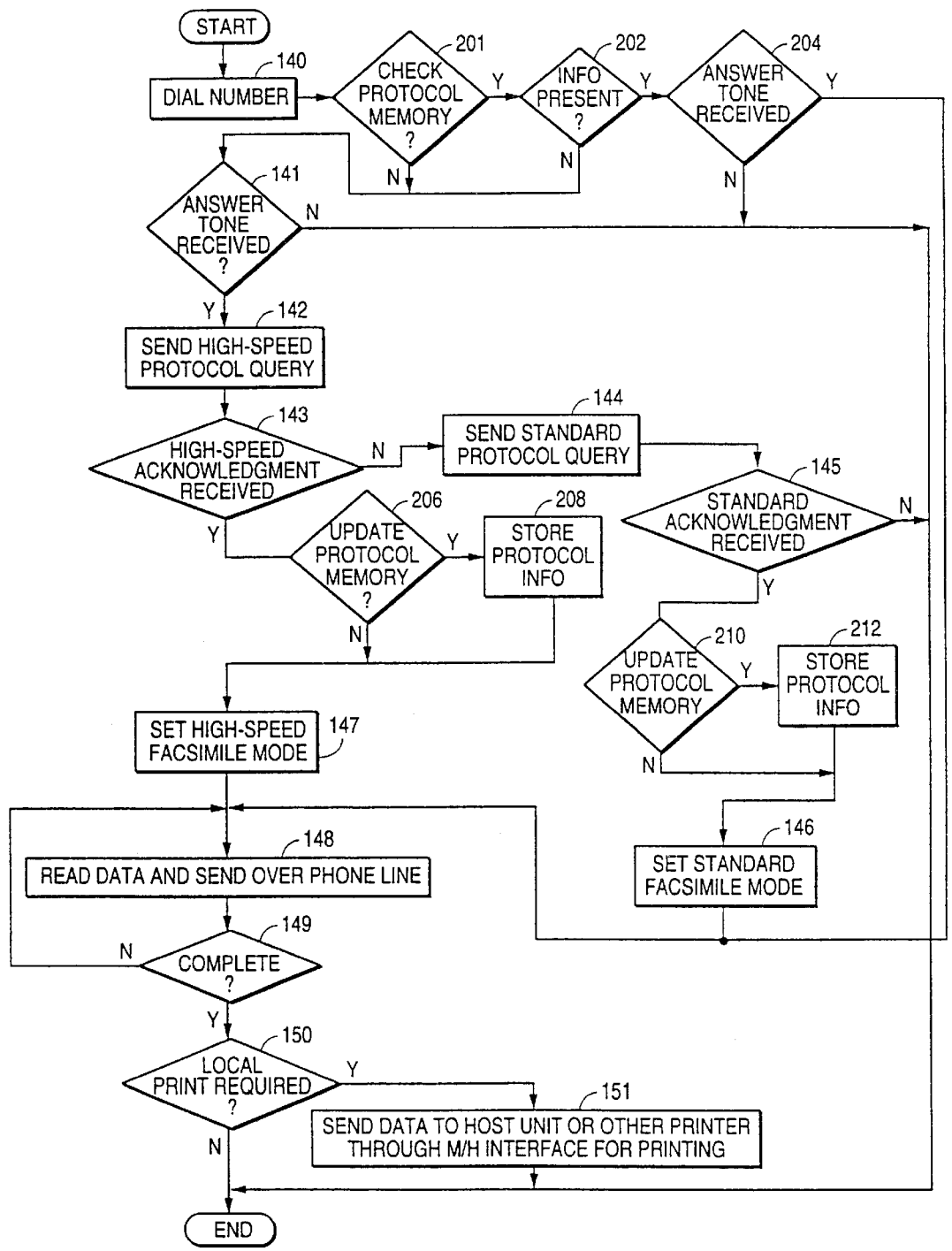
FIG. 7 is a flow chart of the operation of document transmission.

FIGS. 7 and 7*a* are flow charts of the operation of the telefacsimile module according to the invention in the transmit mode. As mentioned earlier, one feature of this invention is that it can automatically switch between a high-speed fax mode and a standard telefacsimile transmission mode. The phone number of the receiving fax is dialed in step 140. In step 201 (FIG. 7) or 200 (FIG. 7*a*), if the system has a protocol memory for storing destination telefacsimile protocols, the protocol memory can be checked. If a protocol memory is checked, and information is present for the destination telefacsimile device, it is determined if an answer is received from the destination machine (step 204). If the information is not present, the number may be optionally entered in the protocol memory (step 203 in FIG. 7*a*). If an answer is received in step 204, step 205 in FIG. 7*a* may be used to determine if the protocol is to be verified for some reason, such as a periodic verification. If there is no protocol verification option (FIG. 7), control may pass directly to step 148 as discussed below. If no protocol memory check takes place (steps 200 and 201) or the protocol for the number dialed is not present (step 202), whether an answer tone was received is determined in step 141. If not, execution of the transmission routine ends.

If an answer tone is received, then in step 142 a query is sent to the receiving telefacsimile to determine whether it can operate in the high-speed protocol mode. If no high-speed acknowledgement is received within a predetermined time, step 143 transfers control to step 144 which sends a standard telefacsimile protocol query it will be understood that the order of the queries can be reversed. If a standard telefacsimile acknowledgement is not received, then step 145 exits from the transmission routine if either a standard or high speed acknowledgement is received, steps 210 and 206, respectively can test if the protocol memory should be updated. If so, control passes through memory update step 212 or 208 for the standard and high speed modes, respectively. It will be known by those of ordinary skill that the update protocol inquiries in steps 210 and 206 and store protocol information instructions for steps 208 and 212 may call the same processing routines, respectively.

If a standard telefacsimile acknowledgement is received in step 145, control passes to step 146 where the standard telefacsimile mode of transmission is set in the facsimile module and control is passed to step 300 in FIG. 7*a* or directly to step 148 in FIG. 7. If a high-speed protocol acknowledgement is recognized in step 143, control passes to step 147, where the high-speed protocol mode of transmission is set in the facsimile module.

Optionally, the need to make protocol inquiries might be bypassed by instructions based on information recalled from a memory of protocols of various fax numbers. However, it is preferable that even when a protocol memory is present, protocol queries are made with every transmission. If any variance with protocol information stored in memory is discovered, memory can be updated to reflect this new information.

A method of verifying protocol and integrating updates with a system in which documents are received from the host unit 500 and preformatted (such as that shown in FIG. 4*a*) is shown in FIG. 7*a*. This is accomplished in steps 300–312. In step 300, in either the high or low speed modes, a preformatted document taken from memory (step 304) is checked. If the document format is compatible, control passes to step 148. If not, new compatible protocol information is stored (step 306). If this other protocol is already stored, it is selected (steps 308 and 312). If not, the reformatting time may optionally be estimated in step 310. If reformatting time is long, or in an embodiment where step 310 is omitted, the process is terminated, while a relatively short reformatting time results in executing the strategy beginning at step 101*a*, as shown in FIG. 4*a*.

In step 148 the data to be sent is read from memory or directly from the H/M interface 601 and sent over the phone line using either the high-speed mode or the standard telefacsimile mode, depending on which mode was previously set. The telefacsimile data is sent by step 148 until the transmission is complete. At this point step 149 passes control to step 150 which determines if a local printout of the transmitted document is required. This feature allows an operator at a transmitting facsimile to obtain a copy of the document that will actually be printed at the receiving end so that it may be checked for any possible errors in scanning and character recognition. If a local printout is required, then step 150 passes control to step 151 where the transmitted document is sent to the host unit 500 through the M/H interface 602 to be printed. Subsequently, the transmission routine is exited.

The local printout of the transmitted document may optionally be solicited before actually dialing the remote facsimile machine to enable it to be checked for accuracy before actually sending it. Alternatively, it might be displayed on a CRT monitor or equivalent, and/or printed on a printer other than the host unit.

Further, the telefacsimile module according to the invention may optionally be provided with an editing means to override applying OCR techniques in a defined portion of a document or the document as a whole where parsing or recognition errors were either detected by the user or else suspected to be liable to arise based on the character of the original material, i.e., a poor photocopy of the original document. Such an editing feature is illustrated in blocks 104*a* and 104*b* connected by dotted lines in the flow chart of FIG. 4. This editing feature is optional, however, since a prime advantage of the invention is in not wasting time and energy on anything that is difficult to be parsed or recognized. Such material is preferably simply sent as standard fax data, instead of devoting a great deal of human or computing resources to trying to decipher it.

Figure 8:
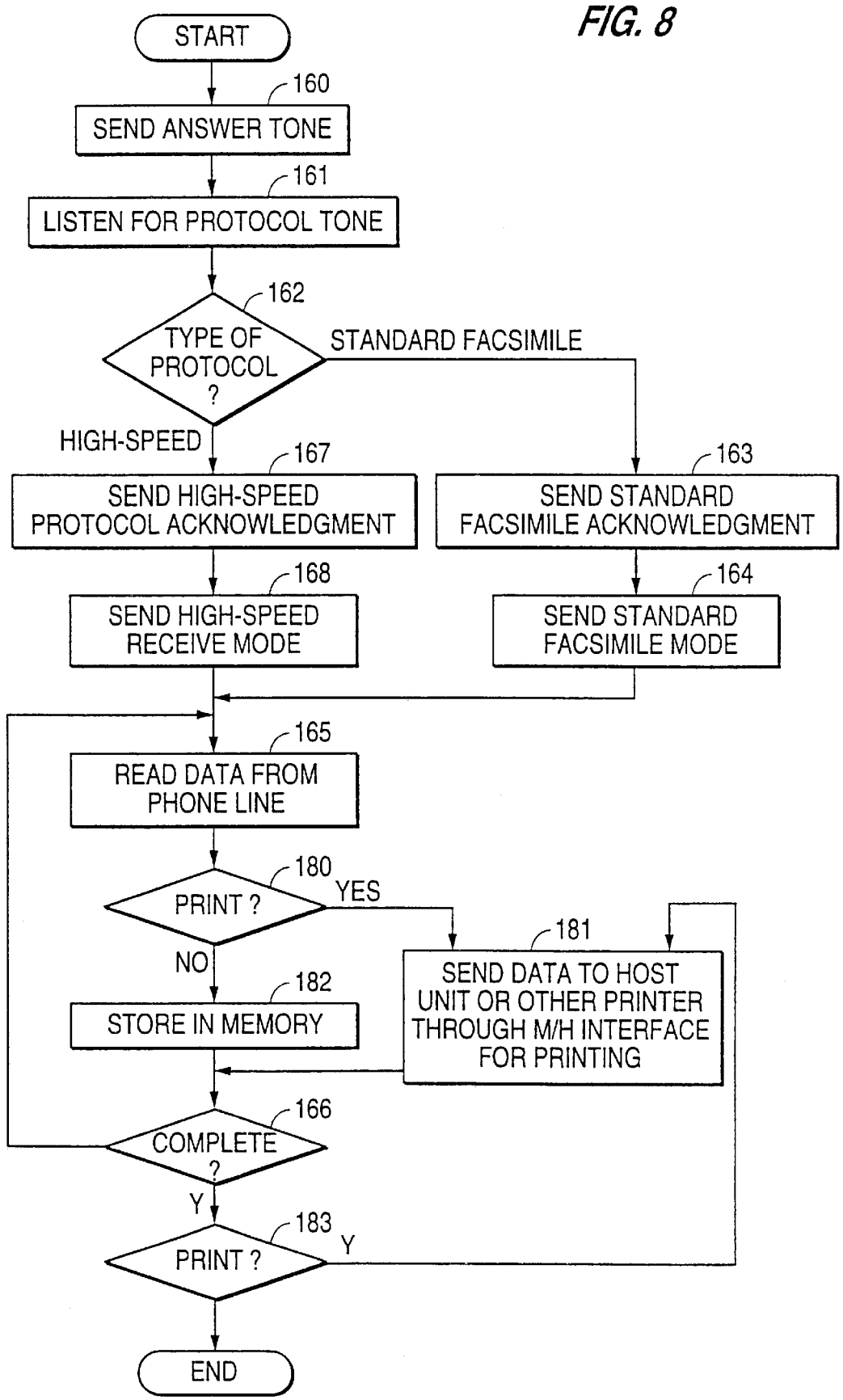
FIG. 8 is a flow chart of the operation of document reception.

FIG. 8 is a flow chart of the steps required to receive data at a telefacsimile module 600 from a transmitting telefacsimile. In step 160, the receiver 96 of the telefacsimile module answers the phone and sends an answer tone. In step 161, a protocol analyzer 97 of a receiver 622 of the telefacsimile module (FIG. 2*a*) listens for a protocol signal sent by the transmitting telefacsimile. If the transmitting telefacsimile indicates that data is being sent in the standard mode, then step 162 passes control to step 163 where a standard telefacsimile acknowledgement is sent and then to step 164, where the telefacsimile module is set in the standard mode. Control is then passed to step 165. If a high-speed protocol signal is received by the mode detector 96 in step 162, then control is passed to step 167, where a high-speed protocol acknowledgement is sent by the receive mode detector of the receiving telefacsimile module. At this point the high-speed receive mode is set in step 168. In step 165, data from the transmitting telefacsimile module is read from the phone line and placed into the memory 614 (step 182), or alternatively, routed directly to the host unit for printing (steps 180, 181) through the M/H interface 602. Data is read from the phone line and placed in the memory or routed to the printer in the host unit 500 in step 165 until at step 166 it is decided that reception is complete. Using character decoder 99, the received characters can be decoded and accessed through character library 64. Processing then takes place as previously discussed relative to FIG. 6 or 6a to complete printing of the received document. It should be noted that the invention is not limited to printing the received document but is equally applicable to storing the document on disk or on any other suitable storage means so that the document can be printed either upon completion of reception (step 183) or at another convenient time. Similarly, suitably expanded and/or formatted received fax data could be routed to a laser or other printer not integrated with a conventional or high speed fax device.

The control and sequencing of the telefacsimile coding transmission and reception system as shown in the flow charts described above is preferably implemented using the microprocessor of controls 640 and 119 programmed to carry out the flow chart sequencing. Alternately, dedicated hardware or firmware such as ROM chips or the like may be employed.

As the above description illustrates, receiving conventional fax data, coding and decoding can all be performed on line, so that documents need not be stored in a memory buffer, but may be transmitted in real time over the communications media. Alternatively documents which are to be transmitted or which are received can be stored in memory for processing and accessed as required by the system.

While particular embodiments of the present invention have been illustrated and described above, it will be clear that the invention can take a variety of forms and embodiments within the scope of the appended claims.

It will be further understood that, insofar as this invention incorporates certain improvements or refinements in method and apparatus over my U.S. Pat. No. 5,274,474, such improvements or refinements may be incorporated integrally with a host telefacsimile machine without departing from the scope of this invention.

What is claimed is:

1. A method of transmitting documents using a document transmission module which is connected between a document digitizing device and a communication interface, the method comprising the steps of:
   (a) receiving output representative of a document to be transmitted from the document digitizing device;
   (b) activating one of a standard speed mode and a high speed mode with a mode selector, the activated mode being compatible with an available mode at a destination receiver; and
   (c) (1) in the standard speed mode, transmitting said output in an image data mode; and (2) in the high speed mode identifying, by character recognition techniques, character and non-character information in the document, and formatting the identified character information in an abbreviated code for each character and the non-character information into bit-mapped pixels, and transmitting the abbreviated codes and bit-mapped pixels in the high speed mode.

2. The method recited in claim 1, wherein said non-character information is formatted as one of compressed bit-mapped pixels and uncompressed bit-mapped pixels.

3. The method recited in claim 2, further comprising interrogating said destination receiver and determining if a high speed mode is available at the destination receiver.

4. The method recited in claim 3, wherein the step of interrogating said destination receiver comprises transmitting from a mode determiner a mode query signal to the destination receiver and determining in a mode detector a response from the destination receiver.

5. The method recited in claim 4, further comprising storing in a memory the response of the destination receiver queried after transmission of said mode query signal.

6. The method recited in claim 5, further comprising referencing the stored response to select the mode of formatting of additional documents destined for said destination receiver queried after transmission of said mode query signal.

7. The method recited in claim 5, further comprising referencing the stored response to select the mode of transmission.

8. The method recited in claim 4, wherein the mode detector measures a time from transmission of the mode query signal and, if a predetermined time elapses without detecting a response, directs the document transmission module to set the standard speed mode.

9. The method recited in claim 2, wherein a text character separator isolates individual text characters from each other.

10. The method recited in claim 9, wherein a character recognizer determines if isolated text characters correspond to entries in a character library containing abbreviated codes.

11. The method recited in claim 9, wherein omnifont character recognition techniques are used.

12. The method recited in claim 2, wherein omnifont character recognition techniques are used.

13. The method recited in claim 2, further comprising recording a representation of the document received in at least one storage medium.

14. The method recited in claim 2, further comprising expanding compressed output of said document digitizing device to provide input compatible with the character recognition techniques employed in the high speed mode.

15. The method recited in claim 14, further comprising distinguishing between text and graphics in said output of said document digitizing device.

16. The method recited in claim 2, further comprising distinguishing between text and graphics in said output of said document digitizing device.

17. The method recited in claim 2, further comprising the step of receiving at a receiver in said document transmission module through the communication interface data in one of the standard and high speed modes.

18. The method recited in claim 17, further comprising the step of determining in said receiver one of the standard and high speed modes of an incoming data.

19. The method recited in claim 17, further comprising the step of selecting in said receiver one of the high speed mode and the standard mode to correspond with the mode of the incoming data indicated by a protocol signal.

20. The method recited in claim 17, further comprising the step of decoding in a decoder the abbreviated codes received for each character in the high speed mode.

21. The method recited in claim 20, further comprising creating at least one text file for the identified character information, and at least one overlay file for the non-character information in the high speed mode.

22. The method recited in claim 21, wherein said at least one text file and said at least one overlay file are adapted to be merged together for reproducing their contents in the same spatial relationship as in the original document.

23. The method recited in claim 20, further comprising identifying a position coordinate for each identified character in the high speed mode.

24. The method recited in claim 23, further comprising transmitting said position coordinates in conjunction with said identified character information in the high speed mode.

25. The method recited in claim 17, further comprising creating at least one text file for the identified character information, and at least one overlay file for the non-character information in the high speed mode.

26. The method recited in claim 25, wherein said at least one text file and said at least one overlay file are adapted to be merged together for reproducing their contents in the same spatial relationship as in the original document.

27. The method recited in claim 17, further comprising identifying a position coordinate for each identified character in the high speed mode.

28. The method recited in claim 27, further comprising transmitting said position coordinates in conjunction with said identified character information in the high speed mode.

29. The method recited in claim 2, further comprising creating at least one text file for the identified character information, and at least one overlay file for the non-character information in the high speed mode.

30. The method recited in claim 29, wherein said at least one text file and said at least one overlay file are adapted to be merged together for reproducing their contents in the same spatial relationship as in the original document.

31. The method recited in claim 2, further comprising identifying a position coordinate for each identified character in the high speed mode.

32. The method recited in claim 31, further comprising transmitting said position coordinates in conjunction with said identified character information in the high speed mode.

33. The method recited in claim 2, further comprising verifying and correcting errors in output in the high speed mode.

34. The method recited in claim 33, further comprising using at least one of a monitor and a hard-copy printout to verify output in the high speed mode.

35. The method recited in claim 33, further comprising using a keyboard or other input device to input data for overriding the results of optical character recognition.

36. The method recited in one of claims 2, 17 or 29–22, further comprising merging in the high speed mode the identified character information and the non-character information for reproduction in the same spatial relationship as in the original document.

37. The method recited in claim 36, wherein said document transmission module is integrated with said document digitizing device.

38. The method recited in one of claims 2, 17 or 31–24, further comprising using said position coordinates to enable reproduction in the high speed mode of the identified character information and the non-character information in the same spatial relationship as in the original document.

39. The method recited in claim 38, wherein said document transmission module is integrated with said document digitizing device.

40. The method recited in claim 2, 11, 34, or 35, wherein said document transmission module is integrated with said document digitizing device.

41. A document transmission module which is connected between a document digitizing device and a communication interface, comprising:
(a) means for receiving from the document digitizing device output representative of a document to be transmitted;
(b) a mode selector for activating one of a standard speed mode and a high speed mode, the activated mode being compatible with an available mode at a destination receiver device;
(c) a control and data interface, operative in the standard speed mode for transmitting said output in an image data mode, and operative in the high speed mode, to use character recognition techniques to format said output into identified character information in combination with non-character information, wherein said identified character information is formatted in abbreviated code and said non-character information is formatted into bit-mapped pixels.

42. The document transmission module recited in claim 41, wherein said non-character information is formatted as one of compressed bit-mapped pixels and uncompressed bit-mapped pixels.

43. The document transmission module recited in claim 42, further comprising means for expanding compressed output of said document digitizing device into a format compatible with the character recognition techniques used in the high speed mode.

44. The document transmission module recited in claim 42, further comprising a transmitter for transmitting data in the selected one of the standard and high speed modes.

45. The document transmission module recited in claim 44, further comprising verification and error-correcting means for verifying and correcting errors in output in the high speed mode.

46. The document transmission module recited in claim 45, wherein said verification means is at least one of a monitor and a hard-copy printout.

47. The document transmission module recited in claim 45, wherein said error-correcting means is a keyboard or other input device for inputting data to override the results of optical character recognition.

48. The document transmission module recited in claim 42, further comprising a receiver for receiving incoming data from the communication interface in a selected one of the standard and high speed modes.

49. The document transmission module recited in claim 48, wherein the receiver contains a receive mode detector for determining a mode of incoming data.

50. The document transmission module recited in claim 49, wherein the receive mode detector contains a protocol analyzer for selecting one of the high speed mode and the standard mode to correspond with the mode of the incoming data indicated by a protocol signal.

51. The document transmission module recited in claim 48, further comprising a decoder for decoding abbreviated codes received in the high speed mode.

52. The document transmission module recited in claim 51, further comprising at least one text file for receiving the identified character information, and at least one overlay file for the non-character information in the high speed mode.

53. The document transmission module recited in claim 52, wherein said at least one text file and at least one overlay file are adapted to be merged together.

54. The document transmission module recited in claim 51, further comprising a position coordinate identified for each identified character in the high speed mode.

55. The document transmission module recited in claim 54, wherein said position coordinates are transmitted in conjunction with said identified character information in the high speed mode.

56. The document transmission module recited in claim 48, further comprising at least one text file for receiving the identified character information, and at least one overlay file for the non-character information in the high speed mode.

57. The document transmission module recited in claim 56, wherein said at least one text file and at least one overlay file are adapted to be merged together.

58. The document transmission module recited in claim 48, further comprising a position coordinate identified for each identified character in the high speed mode.

59. The document transmission module recited in claim 58, wherein said position coordinates are transmitted in conjunction with said identified character information in the high speed mode.

60. The document transmission module recited in claim 42, wherein the mode selector further comprises a mode determiner for determining if a high speed mode is available at said destination receiver device.

61. The document transmission module recited in claim 60, wherein said mode determiner comprises a signal generator for transmitting a mode query signal to said destination receiver device and mode detector for determining a response from the destination receiver.

62. The document transmission module recited in claim 61, further comprising a memory for storing said response.

63. The document transmission module recited in claim 61, wherein the mode detector contains a timer for measuring a time from transmission of the mode query signal and for, if after a predetermined time elapses without detecting a response, directing the document transmission module to set the standard speed mode.

64. The document transmission module recited in claim 42, wherein the abbreviated code is an ASCII code.

65. The document transmission module recited in claim 42, further comprising a text character separator for isolating individual text characters from each other.

66. The document transmission module recited in claim 65, further comprising a character library and a character recognizer for determining if isolated text characters correspond to entries in the character library.

67. The document transmission module recited in claim 66, wherein the entries in the character library contain the abbreviated codes.

68. The document transmission module recited in claim 65, wherein said character recognition techniques are omnifont character recognition techniques.

69. The document transmission module recited in claim 42, wherein said character recognition techniques are omnifont character recognition techniques.

70. The document transmission module recited in claim 42, wherein the control and data interface further includes means for distinguishing between text and graphics in said output representative of a document to be transmitted.

71. The document transmission module recited in claim 42, further comprising at least one storage medium for recording a representation of said digitized document.

72. The document transmission module recited in claim 42, further comprising at least one text file for receiving the identified character information, and at least one overlay file for the non-character information in the high speed mode.

73. The document transmission module recited in claim 72, wherein said at least one text file and at least one overlay file are adapted to be merged together.

74. The document transmission module recited in claim 42, further comprising a position coordinate identified for each identified character in the high speed mode.

75. The document transmission module recited in claim 74, wherein said position coordinates are transmitted in conjunction with said identified character information in the high speed mode.

76. The document transmission module recited in one of claims 42, 48 or 72–53, further comprising means for merging in the high speed mode the identified character information and the non-character information for reproduction in the same spatial relationship as in the original document.

77. The document transmission module recited in claim 76, wherein said module is integrated with said host document transmission protocol device.

78. The document transmission module recited in one of claims 42, 26 or 74–55, wherein said position coordinates enable reproduction in the high speed mode of the identified character information and the non-character information in the same spatial relationship as in the original document.

79. The document transmission module recited in claim 78, wherein said module is integrated with said host document transmission protocol device.

80. The document transmission module recited in claim 41, 69, 46 or 47, wherein said module is integrated with said host document transmission protocol device.

* * * * *